Sept. 29, 1959

G. H. FRITZINGER 2,906,585

SHEET RECORD MACHINE

Filed Nov. 1, 1955

INVENTOR

George H. Fritzinger

United States Patent Office 2,906,585
Patented Sept. 29, 1959

2,906,585

SHEET RECORD MACHINE

George H. Fritzinger, West Orange, N.J., assignor, by mesne assignments, to McGraw-Edison Company, Elgin, Ill., a corporation of Delaware Application November 1, 1955, Serial No. 544,154

5 Claims. (Cl. 346—127)

This invention relates to sheet record machines which have a revolvable record support with an endless surface for carrying a flexible sheet record in wrap-around relation thereto. More particularly, it relates to an improvement on the sheet record machine described in the commonly-owned pending application Serial No. 468,442 of Dinsmore et al. filed November 12, 1954, and issued June 2, 1959, as Patent No. 2,889,191, which improvement is adapted to facilitate the removal of sheet records from the machine.

In machines of the character referred to there is provided a sheet guide structure having a slot for directing a sheet record into a loading position and for receiving and guiding the sheet record out of the machine as the record support is reversed. In accordance with the preferred such arrangement, the slot is provided with a closure member at its outer end, which is movable to an open position to provide the slot with a flared opening both to facilitate insertion of a sheet record into the slot preparatory to mounting the sheet record on the record support, and to facilitate the manual pickup of the trailing edge of the sheet record as the sheet record is ejected from the machine. It has been heretofore proposed to provide such machines with an ejecting apparatus which, when once set into operation, will produce a measured reverse movement of the record support. However, such measured movement requires complicated and expensive apparatus. In accordance with the present invention this complexity is circumvented by providing a control member for the eject mechanism for maintaining the mechanism in operation only so long as the control member is depressed, and by placing this control member at the outer end of the guide slot for operation by the aforestated closure member as this member is moved yieldably beyond a normal open position. Thus, a user of the machine may put the eject mechanism into operation and maintain it in operation merely by holding his hand in a convenient position adapted to receive the sheet as it is ejected from the guide slot.

A further feature of the invention is to provide for the lifting of the record-scanning apparatus from the record support as the closure member at the outer end of the slot is held beyond its normally-open position.

Objects of the invention are therefore to provide improvements for slot-type loading and/or ejecting structures for sheet record machines which will enable a user to mount and remove sheet records conveniently and with relatively simple and inexpensive apparatus.

These and other objects and features of my invention will be apparent from the following description and the appended claims.

In the description of my invention reference is had to the accompanying drawings, of which:

Figure 1:
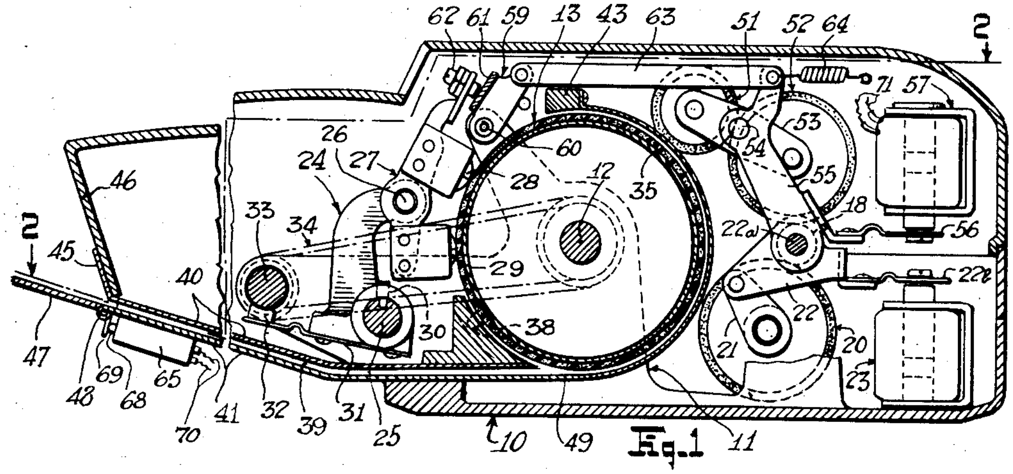
Figure 1 is a fractional, sectional view of a sheet record machine embodying my invention, taken substantially on the line 1—1 of Figure 2.

The sheet record machine shown in the accompanying drawings is a dictation recording and/or reproducing machine adapted for operation on and from magnetic-type sheet records. This machine may have a base 10 provided with laterally-spaced, upright standards of which only the left one 11 is shown. These standards have bearings for a shaft 12 carrying a rotatable record support in the form, for example, of a drum 13. The drum is driven by a motor 14 coupled by a belt 15 to a driven pulley 16. This pulley has a shaft 17 journaled in a standard 17*a*. This shaft is provided with a driving wheel 18 which is coupled by a forward drive clutch to a wheel 19 mounted on the shaft 12 of the drum, said forward drive clutch comprising a shiftable intermediate wheel 20 having a friction driving surface as of rubber. This intermediate wheel is journaled to one end of a link 21 pivoted at its other end to a lever 22. The lever is pivoted on a stud 22*a* mounted on the standard 11 in line with the shaft 17, and is provided with a spring arm 22*b* which is connected to the armature of a solenoid 23. When the solenoid is not energized the intermediate wheel 20 is disengaged as shown in Figure 1, but as the solenoid is activated this wheel is drawn between the driving wheel 18 and the wheel 19 to couple the driving motor to the drum.

At the front of the drum there is a carriage 24 mounted slidably on a cross rod 25 for lateral movement along the drum. Pivoted at 26 to this carriage is a rocker beam 27 onto one end of which is mounted an erasing head 28 and onto the other end of which is mounted a record-reproduce head 29. The carriage 24 can be rocked rearwardly and forwardly to place the heads into and out of engagement with the record support. For this purpose the carriage may be splined at 30 to the support rod 25 so that the shifting of the carriage may be accomplished by turning the rod. Mounted on the carriage is a cantilever spring 31 carrying a feed nut 32 which is moved into and out of engagement with a feed screw 33 concurrently as the carriage is rocked to place the heads into and out of engagement with the record support. This feed screw has a constant drive coupling with the shaft 12 by means of a chain drive indicated at 34. The feed screw and support rod 25 are mounted in bearings carried by the aforementioned standards.

Figure 3:
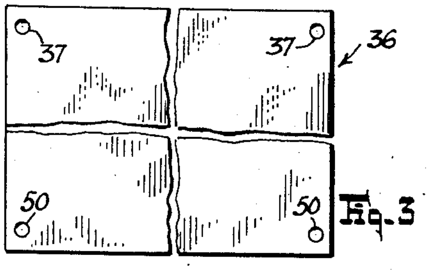
Figure 3 is a fractional view of a sheet record to be used in the present machine.

The drum 13 is covered with at layer of resilient material 35 such as of rubber to provide a yieldable backing for a sheet record 36 shown in Figure 3. The sheet record has drive holes or eyelets 37 in its leading corner portions which are engageable with respective hooks 38 at opposite ends of the drum to provide for drive of the sheet record with the record support as the record support is advanced.

The two heads 28 and 29 are in a vertical plane at right angles to the shaft 12 so that they scan the same track on the record. In response to suitable biasing of the carriage they engage the sheet record with necessary pressure to have a firm contact therewith. When the drum is driven in an advancing direction, the heads are moved progressively along the drum to describe a helical track, with the erase head being in advance of the record head to erase any prior recording on the track during operation of the machine as a recording instrument. When the machine is used as a reproducing instrument, the erase head is disabled. The audio circuits of the machine for feeding energy to and from the heads as well as for abling and disabling the erase head need not however be herein described. The mounting of a sheet record onto the record support involves firstly a placing of the sheet record into a proper loading position wherein the leading edge thereof is in overlapping relation with the drum. When the drum is then advanced the hooks 38 will first deflect the corner portions of the sheet record outwardly and then, when they come into alignment with the holes 37, the sheet record will flex inwardly in response to its natural resilience or to the yieldable means which may be provided to cause the sheet record to become attached to the drum.

Figure 2:
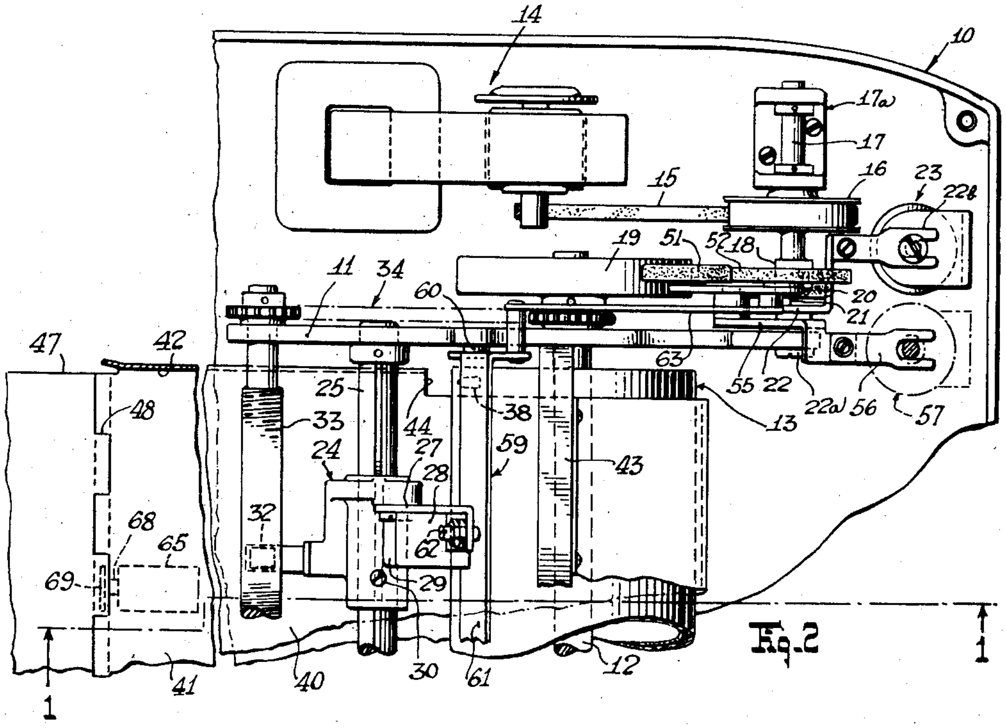
Figure 2 is a fractional, top plan view of such machine with the housing broken away.

The means for presenting the sheet into such loading position comprises a loading apparatus having a loading slot 39 which is at least approximately as long as the sheet record. This slot may be formed by a pair of nearly horizontal upper and lower plates 40 and 41 having closing edges 42 at opposite sides of the plate. The upper plate terminates just short of the drum on a line tangential thereto, but the lower plate is extended partially around the drum in spaced relation thereto. The reason the lower plate is not extended fully around the drum is to provide a space through which the heads may have access to the sheet record on the drum. A cross bar 43 provides support for the terminal edge of the extended-around portion of the lower plate. As shown in Figure 2, the portion of the lower plate surrounding the drum is cut away at 44 to provide clearance space for the hooks 38. This permits the leading corner portions of the sheet record to be deflected first away from the drum by the hooks 38 as the hooks come into registration with the holes 37, it being understood that the hooks are made substantially longer than the distance of spacing of the arcuate portion of the lower plate 41 from the drum.

The forward end of the loading slot is preferably provided with an outwardly-flared opening to facilitate the insertion of the sheet record into the slot. The flared opening may be formed between an upper inclined wall 45 forming a continuation of the upper plate 40 as well as a forward wall portion of the cabinet structure 46 of the machine, and a lower shelf 47 forming a substantially even extension of the lower plate 41. The shelf 47 is hinged to the loading structure at 48 to enable the shelf to be moved upwardly into a closed position wherein it conforms with the forward inclined wall of the cabinet structure. A correct loading position for a sheet record is one wherein the sheet record has been inserted into the slot 39 to the point where the trailing edge is just even with the outer edge of the shelf 47. However, some variation in the loading position is permissible, as for instance as between the position just mentioned and a position where the outer edge of the sheet record is at the apex of the flared opening of the slot. After a sheet record has been so mounted, the shelf 47 is closed to conceal the leading edge of the sheet record and to provide a slight drag resistance on the outer trailing edge of the record to retain it in a correct loading position.

The plate 40 of the guide structure terminates in an edge 49 in proximity to the drum 13 so that it will serve as a stripping member that will engage the under side of the trailing edge of a mounted sheet record and direct the record into the slot 39 as the drum is reversed. Upon the forward shelf 47 being opened, the trailing edge will appear at the flared opening as the hooks 38 become disengaged from the sheet record. The trailing edge of the sheet record may then be picked up by the fingers to enable the record to be readily withdrawn from the machine. In order to provide for positive drive of the record as the drum is reversed, the sheet record may also have holes 50 in its trailing corner portions which will become engaged also with the hooks 38 when the sheet record is mounted on the drum by virtue of the sheet record having such length that the trailing edge will overlap the leading edge. However, for the purposes of my invention hereinafter described, it will be understood that overlapping of the edges is not required.

It is desirable to provide for power drive of the drum as a sheet record is to be ejected. Heretofore, it has been proposed that upon setting a reverse-drive apparatus into motion the drum will receive a measured amount of reverse movement sufficient to eject the record. This involves complicated control apparatus which my invention is adapted to avoid. In accordance with the present invention, the reverse drive of the drum for sheet ejection is set into operation by depressing the forward shelf 47 downwardly below a normally-open position shown in Figure 1. This is a natural thing to do in order to present the fingers of the hand in a position to pick up the edge of the sheet record as it appears at the open end of the slot. Thus, the user will depress the shelf 47 and merely hold it in such position until the edge of the sheet record appears in position to be gripped and withdrawn from the machine.

The reverse drive of the drum may be carried out, for example, by a reverse drive clutch between the motor 14 and the drum comprising a pair of engaged intercoupling wheels 51 and 52 provided with friction driving surfaces such as of rubber. These wheels are journaled to opposite ends of a rocker 53 which itself is pivoted at 54 to a lever 55. The lever 55 is pivoted to the aforementioned stud 17*a* and is provided with a spring arm 56 connected to the armature of an eject solenoid 57. When the solenoid is not energized, the lever 55 is in such position that the intermediate coupling wheels 51 and 52 are disengaged, but when the solenoid becomes activated these wheels are pressed downwardly into frictional engagement respectively with the driving wheel 18 and the wheel 19. Since there are thus interposed two intercoupling wheels between the wheels 18 and 19, the drum will now be turned in a reverse direction.

In order to permit reverse drive movement of the drum from any position without danger of the trailing edge becoming fouled on the heads, it is desirable to disengage the heads from the record support during record ejection. For this purpose there is provided a transverse bail 59 which extends throughout the length of travel of the carriage 24 across the upper part of the drum. This bail is pivoted to the frame of the machine at 60 and has a face 61 confronting an adjustable pin 62 on the upper part of the carriage. The bail is coupled by a link 63 to the lever 55. A spring 64 serves normally to hold the intercoupling wheels 51 and 52 disengaged as well as to hold the bail in a forward position free from the carriage. However, when the eject solenoid 57 is energized the bail is shifted forwardly to move the face 61 against the pin 62 whereby to rock the carriage 24 forwardly to disengage the heads from the record support.

It is a feature of my invention not only to control reverse movement of the drum for record-ejecting purposes by the shelf 47 but also to control the disengagement of the heads from the record support by this same means. For this purpose a switch 65 is mounted on the machine for operation by the shelf 47. By way of example, the switch may be mounted on the underside of the forward portion of the machine and have an operating button 68 spring-urged forwardly and adapted to define the normal open position of the shelf 47 by the impingement of a lug 69 of this shelf against the button 68. This allows the shelf, however, to be depressed beyond its normally-open position and to close the switch 65 as this is done. The switch 65 has a pair of leadout wires 70, fractionally shown, which connect with wires 71 leading out from the eject solenoid 57 as into a power circuit including a suitable source of power not necessary to show, it being understood that any circuit which will cause energization of the eject solenoid as the forward shelf 47 is depressed will be suitable.

The foregoing particular embodiment of recording and reproducing machine is intended to be only illustrative as the same may be changed and modified in many ways without departing from the scope of my invention. For example, instead of employing a disengageable clutch of a type which when operated will effect reverse movement of the drum, there may be employed a reversible motor. Furthermore, as to the broader features of my invention, instead of disengaging the heads there may be provided such control of the drum as will prevent its reverse movement until the trailing edge of the sheet record has moved beyond the heads. Still further, from another viewpoint, the shelf 47 may constitute a pressable guide or platform which need neither be closable nor be used in conjunction with any inclined wall to form a flared opening for the loading slot. These and other modifications are within the contemplated scope of my invention, which I endeavor to express according to the following claims.

I claim:

1. In a machine having a revolvable record support with an endless record-supporting surface about which a flexible sheet record is adapted to be wrapped with its leading edge attached to said support: the combination of a fastening means on said support and of complementary means on the leading portion of a sheet record interengageable for attaching the sheet record to the support; a record guide structure having a slot leading from said record support and including a means for guiding a sheet record trailing edge first, from said support into said slot as the support is reversed; means for reversing said support; a manual control means at the outer end of said slot operable to start said reversing means, said record guide structure having a flared opening at the outer end of said slot to enable a sheet record to be picked up manually as the edge of the sheet record emerges from the slot; a movable member biased into a normal position wherein it forms a side of the flared outer end portion of said slot and displaceable from said normal position without obstructing the open end of said slot; and means for operating said manual control means by said movable side member as the latter is displaced out of normal position.

2. In a machine having a revolvable record support with an endless record-supporting surface about which a flexible sheet record is adapted to be wrapped with its leading edge attached to said support: the combination of a fastening means on said support and of complementary means on the leading portion of a sheet record interengageable for attaching the sheet record to the support; a record guide structure having a slot leading from said record support and including a means for guiding a sheet record trailing edge first from said support into said slot as the support is reversed; means for reversing said support; a manual control means at the outer end of said slot for said reversing means, said slot extending substantially horizontally from said record support; a movable shelf constituting the bottom side of a flared outer end portion of said slot; means biasing said movable shelf upwardly into a position wherein it forms an even extension of the bottom wall of said slot; and means for operating said manual control means to start said reversing means by pressing said shelf downwardly from normal position.

3. In a machine having a revolvable record support with an endless record-supporting surface about which a flexible sheet record is adapted to be wrapped with its leading edge attached to said support: the combination of a fastening means on said support and of complementary means on the leading portion of a sheet record interengageable for attaching the sheet record to the support; a loading structure having a substantially horizontal loading slot leading to said record support for guiding a sheet record into a loading position for attachment to said support and for guiding the sheet record, trailing edge first, out of the machine as the support is reversed; a hinged door at the outer end of said slot openable to provide the slot with a flared opening; power-operated drive means for reversing said record support; yieldable means for defining a normal, open position for said door; and a control switch for said drive means operable by moving said door into a more open position against the resisting force of said yieldable means for causing said record support to continue to move in a reverse direction so long as said door is held in said more open position.

4. The combination set forth in claim 3 including a translating device for scanning a record mounted on said support; and means controlled by said control switch for lifting said translating device from the record as said record support is reversed.

5. In a machine having a revolvable record support with an endless record-supporting surface about which a flexible sheet record is adapted to be wrapped with its leading edge attached to said support: the combination of a fastening means on said support and of complementary means on the leading portion of a sheet record interengageable for attaching the sheet record to the support; a structure having a slot leading from said record support and including a means for guiding a sheet record, trailing edge first, from said support into said slot as the support is reversed; a hinged shelf at the outer end of said slot yieldably supported in a position to form a flared opening for said slot; a translating device for scanning a record mounted on said support; means biasing said translating device towards said support; and means controllable by said shelf as the shelf is depressed for shifting said translating device away from the record support.

References Cited in the file of this patent

UNITED STATES PATENTS

| | | |
|---|---|---|
| 1,197,004 | Ayer | Sept. 5, 1916 |
| 2,508,845 | Thompson | May 23, 1950 |
| 2,653,819 | Roberts | Sept. 29, 1953 |

FOREIGN PATENTS

| | | |
|---|---|---|
| 670,246 | Great Britain | Apr. 16, 1952 |